Sept. 2, 1969     A. H. ANDERSON     3,464,715
COLLAPSIBLE HANDCART
Filed Sept. 9, 1968     2 Sheets-Sheet 1
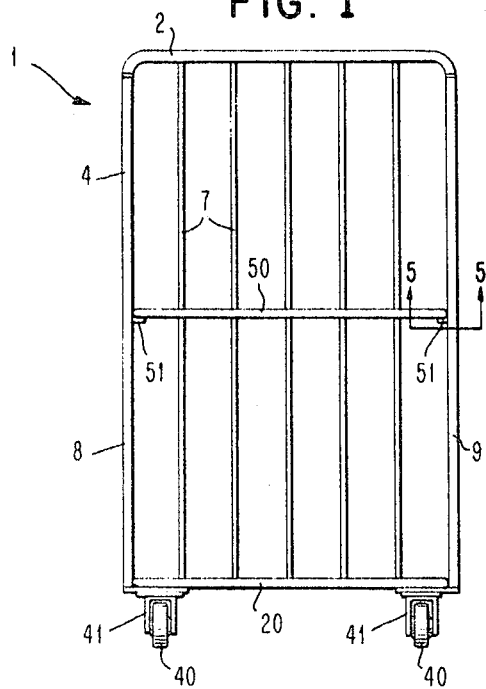
FIG. 1
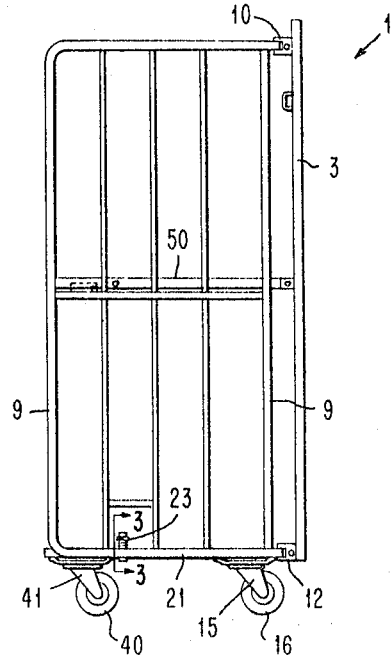
FIG. 2
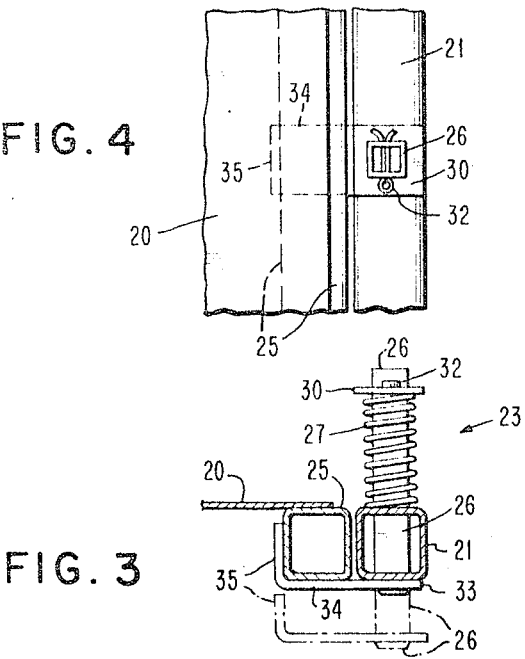
FIG. 4
FIG. 3
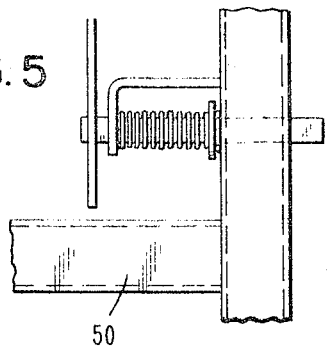
FIG. 5
INVENTOR
ARNE H. ANDERSON
BY *Lowell E. Paige*
ATTORNEY Sept. 2, 1969  A. H. ANDERSON  3,464,715
COLLAPSIBLE HANDCART
Filed Sept. 9, 1968  2 Sheets-Sheet 2
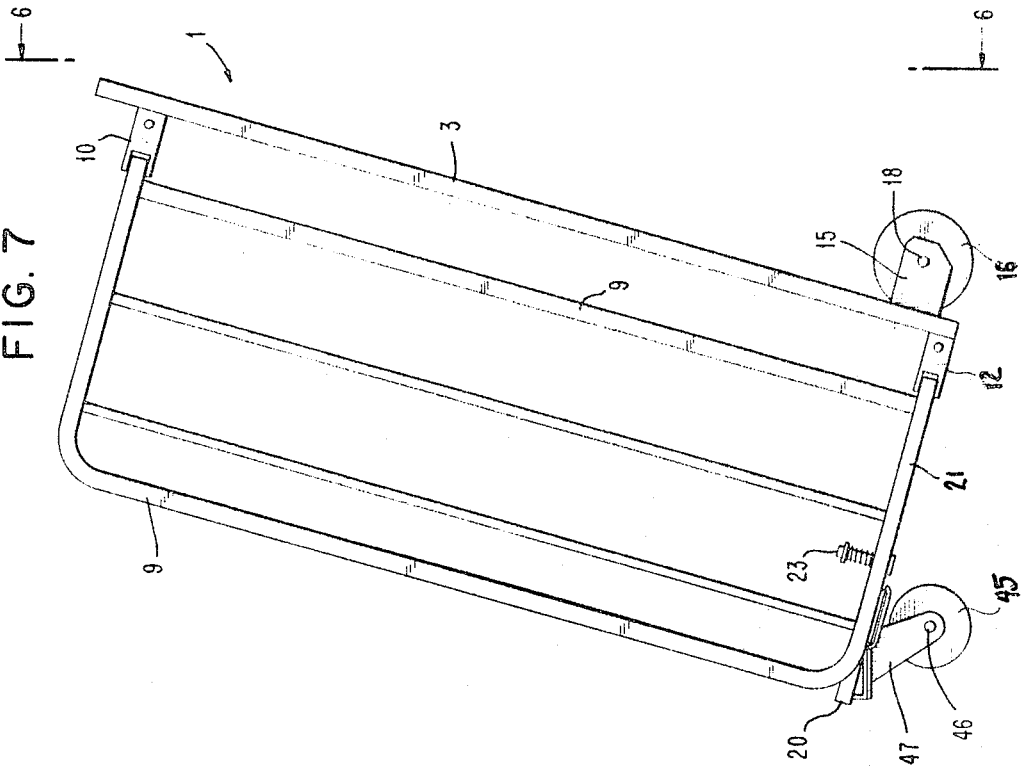
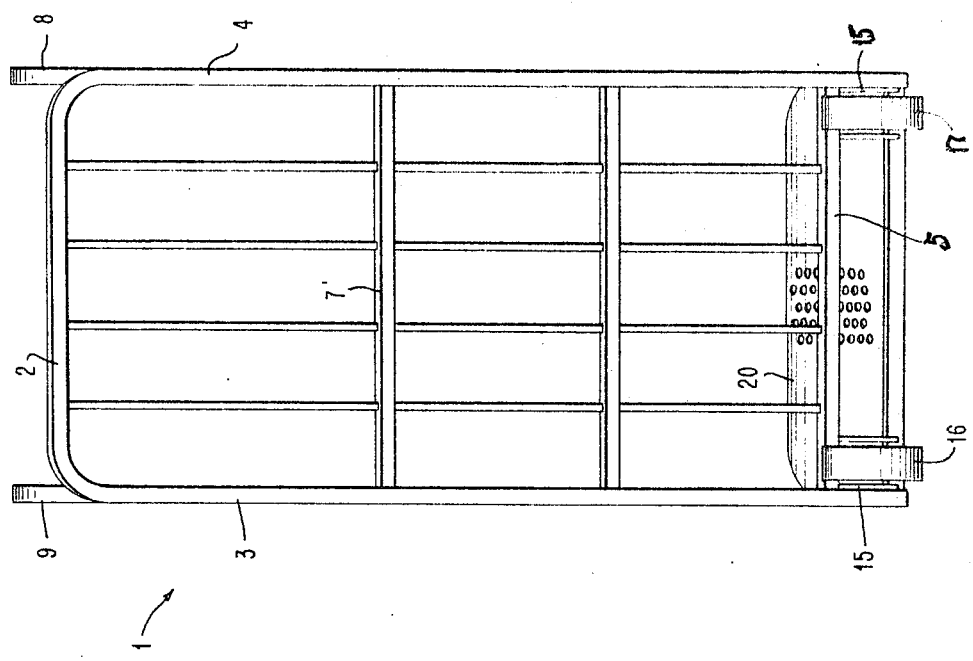

United States Patent Office 3,464,715
Patented Sept. 2, 1969

3,464,715
COLLAPSIBLE HANDCART
Arne H. Anderson, St. Paul, Minn., assignor to John Wood Company, East Orange, N.J., a corporation of Delaware
Filed Sept. 9, 1968, Ser. No. 758,383
Int. Cl. B62b 3/00; B60b 33/00
U.S. Cl. 280—36                                       4 Claims

ABSTRACT OF THE DISCLOSURE

A collapsible handcart suitable for warehousing, trucking transportation, and the like, which is provided with rollers for maneuverablity, and with hinged two sides and a bottom member which may be folded substantially parallel against the back member, so that when folded flat it may occupy in nonuse, or in storage, a minimal amount of space.

SUMMARY

My invention provides a lightweight, sturdy handcart which is adapted to be collapsed to occupy a minimum amount of space, and when in open position will have the hinged side members and bottom member securely locked together into unitary relation, and in which the back member of the cart is provided with an additional hinged horizontal member when opened, to afford a "piggyback" construction.

One object of my invention is to provide a collapsible cart which may be made at minimum cost from, preferably, square tubing and in which the sheet metal bottom member is provided with punched round holes to minimize weight and to provide drainage when being cleaned.

Another object of my invention is to provide a back member of the cart of sufficient height, so that the cart itself may incorporate a "piggyback" feature of an additional horizontal shelf.

Another object of my invention is to provide an economically shaped member for supporting the two rear wheels of the cart.

Another object of my invention is to provide the bottom shelf member with a latch assembly by which the side members and the bottom member may be securely latched together to prevent accidental displacement, such latch assembly being in lieu of the use of such things as spring clip members.

My invention includes the various novel features of construction and arrangement hereinafter disclosed with reference to the accompanying drawings.

Referring to said drawings:

FIG. 1 is a front elevation of my improved collapsible handcart.

FIG. 2 is a side elevation of the cart shown in FIG. 1.

FIG. 3 is a fragmentary sectional view, partly in elevation, showing the latching means for the side member and the bottom member, taken on the line 3—3 in FIG. 2.

FIG. 4 is a fragmentary plan view of the structure shown in FIG. 3.

FIG. 5 is a fragmentary sectional view showing the latching means between the side member and the "piggyback" shelf member, taken on the line 5—5 in FIG. 1.

FIG. 6 is a rear elevation view of a modified structure shown in FIG. 7, taken on the line 6—6 in FIG. 7.

FIG. 7 is a side elevation of the structure shown in FIG. 6, with the modified form of cart shown in backwardly tilted operating position.

Referring more particularly to FIGS. 1 to 5, inclusive; the collapsible handcart includes a main frame member 1 comprised of a horizontal top portion 2 and opposite side vertical portions 3 and 4. The frame member 1 also includes a unitary horizontal bottom portion 5. The frame 1 includes a multiplicity of vertical members 7 connected to the horizontal member 2 and at their bottom ends to the horizontal bottom member 5. Conveniently, an additional horizontal member 7' may be included between the top portion 2 and bottom portion 5 to give additional support to the vertical members 7.

The frame member 1 conveniently may be formed of unitary tubing, preferably of rectangular cross section.

The side members 8 and 9 are pivotally connected to brackets 10 and 12 rigidly connected to the side portions 3 and 4, respectively at the top and bottom ends thereof.

The pivoted side members 8 and 9 are adapted to be moved when in collapsed position to a position in a substantial parallel plane close to the back frame member 1. When the frame members 8 and 9 are extended to their open position, they are pivotally moved through an angle of approximately 90°, or in other words, moved to a position at right angles to the back member.

The bottom of the frame member 1 is provided with a U-shaped channel member 15, as shown in FIG. 7, on which a pair of supporting rear wheels 16 and 17 are mounted on respective shafts 18 journaled in the side portions of the channel members 15. Thus, the rear wheels 16 and 17 are mounted with freedom of rotational movement.

The bottom shelf member 20 is pivotally mounted between the side portions 3 and 4, so that said bottom shelf member 20 when the cart is in a collapsed position may be moved into a plane about parallel with and close to the back frame member 1. When the cart is unfolded into its operating position, the bottom shelf member 20 is in a horizontal plane substantially at right angles to the back member 1.

As shown in the fragmentary views 3 and 4; the bottom horizontal portion 21 of each of the pivotally mounted side members 8 and 9 is provided with latching means, generally indicated at 23, to securely latch the bottom horizontal portion 21 of the side frame members 8 and 9 to the side frame member 25 of the bottom shelf member 20.

Said latching means 23 is comprised of a vertical shaft 26 which is encircled by a spring 27 compressed between the top surface of the bottom member 21 and a plate 30 which is provided with an opening through which the shaft 26 extends. As shown in FIG. 4, the shaft 26 is, conveniently, a piece of rectangular tubing. The upper end of the spring 27 engages the underside of the plate 30, and the spring 27 is held under compression by means of a cotter pin 32 which extends through openings above the plate 30 on opposite sides of the tubing 26, as best shown in FIG. 4. The bottom end of the shaft 26 has rigidly secured thereto a locking member 33 which is comprised of a horizontal portion 34 and a integral vertical upwardly turned portion 35.

As best indicated in FIG. 2 when it is desired to lock a side frame member to the bottom member 20, the user of the cart steps down on the top of the shaft member 26, thereby compressing the spring 27 and lowering the plate 33 rigidly connected thereto sufficiently so that it will clear the bottom end of the side frame member 25 of the bottom shelf 20. Such downward movement is indicated in dotted lines in FIG. 3. The operator then releases the shaft member 26 from downward pressure, and the spring 27 moves the shaft member 26 upwardly and the bottom portion 34 of the plate member 33 engages the bottom of the side frame member of the bottom shelf member 20, and the left and extending portion 35 of the plate member 33 snugly engages the inner side wall of the frame member of the bottom assembly 20.

I find it convenient to provide the form of collapsible carts shown in FIGS. 1–5, inclusive, with a pair of forwardly positioned spaced apart wheels 40, one of which is shown in FIG. 2, which are rotatively mounted on shafts in brackets 41 rigidly secured to the forward portion of the bottom assembly member 20. In the form of collapsible cart shown in FIGS. 6 and 7, I have found it desirable to use a single wheel 45 rotatively mounted on a shaft 46 in the side walls of a U-shaped bracket 47 rigidly mounted at the forward end of the bottom member 20. The bottom periphery of the wheel 45 engages the floor, or some other surface, in the same plane as the rear pair of spaced apart wheels 16 and 17. However, the bracket 47 for the wheel 45 has its forward end of sufficient length to require that forward end of the cart be lifted clockwise to a position to tilt the cart when in operating condition backwardly, as best shown in FIG. 7.

As best shown in FIGS. 1 and 2; the intermediate "piggyback" shelf 50 is hingedly mounted on brackets secured to the back frame member 1. When in operating position, the shelf 50 is moved to a plane substantially parallel to the bottom shelf member 20. When the cart is folded to collapsed position, the shelf member 50 is rotated upwardly until in a position substantially parallel to the back member 1, in the same manner as the bottom shelf member 20 is so moved. in operating position, the sides of the shelf member are rigidly held in horizontal position by coming into contact with support members 51 rigidly connected to the side members, as best indicated at FIG. 1.

I do not desire to limit myself to the precise details of construction and arrangement herein set forth, as it is obvious that various modifications may be made in my invention without departing from the essential features of my invention, as defined in the appended claims.

I claim:

1. A collapsible cart comprising a back main frame member having two spaced apart supporting roller means at the bottom portion thereof; opposite side vertical frame members pivotally connected at their respective top and bottom portions to the respective opposite side portions of said main frame member; a bottom shelf member pivotally mounted at the bottom portion of said main frame member and between said opposite side vertical frame members, said bottom shelf member having roller means mounted at its front portion; an intermediate shelf member pivotally mounted on said main frame member and between the top and bottom thereof; said bottom shelf member and said intermediate shelf member being adapted to be pivotally moved manually from a horizontal position to a folded vertical position substantially parallel with and in close proximity to said main frame member, and said vertical frame members being adapted to be moved pivotally manually from their open position at right angles to said main frame member through an angle of approximately 90° to a collapsed position substantially parallel with and close to said mean frame member; and spring loaded latch means, including a shaft portion which; slidably mounted for movement through the bottom frame portion of said vertical frame members, said latch means shaft portion having rigidly connected at its bottom end a latching member adapted to embrace a side frame portion of said bottom shelf member, said latching member having a horizontal portion adapted to engage the bottom surface of said bottom shelf frame member and a vertical portion adapted to engage the inner side portion of said bottom self member; a spring encircling said shaft portion, said spring held between the top surface of said bottom frame portion of its vertical frame member and the underside of a plate member through which the upper portion of shaft portion extends; and means carried by said shaft portion preventing upward vertical displacement of said plate member.

2. A collapsible cart as in claim 1; wherein said roller means mounted at said front portion of said bottom shelf member are mounted on a bracket of sufficient length to cause the forward end of said cart to be lifted to cause said cart to be titled backwardly mean said cart is in opearting condition.

3. A collapsible cart as in claim 1; wherein said intermiate shelf member is maintained in horizontal position by engaging contact with support members rigidly connected to each of said vertical frame members.

4. A collapsible cart as in claim 1; wherein said intermediate shelf member is maintained in horizontal position by engaging contact with support members rigidly connected to each of said vertical frame members, and adapted to be held securely in said horizontal position by latch means.

References Cited

UNITED STATES PATENTS

| | | | |
|---|---|---|---|
| 413,245 | 10/1889 | Richmond | 292—175 |
| 1,213,471 | 1/1917 | Forbes | 292—128 |
| 3,191,959 | 6/1965 | Heimbruch | 280—36 |

LEO FRIAGLIA, Primary Examiner.

ROBERT R. SONG, Assistant Examiner